(12) United States Patent
Moosavi

(10) Patent No.: US 8,792,824 B2
(45) Date of Patent: Jul. 29, 2014

(54) MOBILE COMMUNICATIONS DEVICE PROVIDING NEAR FIELD COMMUNICATION (NFC) LOW POWER OPERATING FEATURES AND RELATED METHODS

(75) Inventor: Vahid Moosavi, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 198 days.

(21) Appl. No.: 13/368,850

(22) Filed: Feb. 8, 2012

(65) Prior Publication Data

US 2013/0203347 A1 Aug. 8, 2013

(51) Int. Cl.
H04B 5/00 (2006.01)

(52) U.S. Cl.
USPC .......................... 455/41.1; 455/41.2; 455/41.3

(58) Field of Classification Search
USPC .................................... 455/41.1–41.3
See application file for complete search history.

(56) References Cited

U.S. PATENT DOCUMENTS

| | | | |
|---|---|---|---|
| 7,499,985 B2 | 3/2009 | Linjama et al. | |
| 7,555,326 B2 | 6/2009 | Infanti | |
| 8,140,010 B2 * | 3/2012 | Symons et al. | 455/41.1 |
| 2004/0180649 A1 | 9/2004 | Vogel et al. | |
| 2005/0222961 A1 | 10/2005 | Staib et al. | |
| 2006/0022822 A1 | 2/2006 | Wong et al. | |
| 2006/0073819 A1 | 4/2006 | Lowles | |
| 2006/0148404 A1 | 7/2006 | Wakim | |
| 2006/0287004 A1 | 12/2006 | Fuqua | |
| 2007/0095892 A1 | 5/2007 | Lyons et al. | |
| 2007/0124503 A1 | 5/2007 | Ramos et al. | |
| 2007/0156436 A1 | 7/2007 | Fisher et al. | |
| 2007/0165863 A1 | 7/2007 | Moosavi | |
| 2007/0176903 A1 | 8/2007 | Dahlin et al. | |
| 2007/0197261 A1 | 8/2007 | Humbel | |
| 2007/0266131 A1 | 11/2007 | Mazur et al. | |
| 2008/0012706 A1 | 1/2008 | Mak-Fan et al. | |
| 2008/0014989 A1 | 1/2008 | Sandegard et al. | |
| 2008/0034217 A1 | 2/2008 | McQuaide | |
| 2008/0049372 A1 | 2/2008 | Loke | |
| 2008/0116847 A1 | 5/2008 | Loke et al. | |
| 2008/0191892 A1 | 8/2008 | Kirkup et al. | |

(Continued)

FOREIGN PATENT DOCUMENTS

| | | |
|---|---|---|
| EP | 1411709 | 4/2004 |
| EP | 1959332 | 8/2008 |

(Continued)

OTHER PUBLICATIONS

U.S. Appl. No. 12/977,245, Moosavi et al., not yet published.

(Continued)

Primary Examiner — Tuan H Nguyen
(74) Attorney, Agent, or Firm — Allen, Dyer, Doppelt, Milbrath & Gilchrist, P.A.

(57) ABSTRACT

A mobile communications device may include a near field communication (NFC) transceiver capable of operating in a first mode and a second mode, where the NFC transceiver has a load threshold level associated therewith. The mobile communications device may further include a controller coupled with the NFC transceiver. The controller may be capable of switching the NFC transceiver to the first mode when a load detected by the NFC transceiver is below the load threshold level, and switching the NFC transceiver to the second mode when the load detected by the NFC transceiver reaches the load threshold level.

24 Claims, 5 Drawing Sheets

(56) References Cited

U.S. PATENT DOCUMENTS

| | | |
|---|---|---|
| 2008/0246667 A1 | 10/2008 | Symons |
| 2008/0272889 A1 | 11/2008 | Symons |
| 2009/0096413 A1 | 4/2009 | Partovi et al. |
| 2009/0221240 A1 | 9/2009 | Zhang |
| 2010/0081374 A1 | 4/2010 | Moosavi |
| 2010/0085840 A1 | 4/2010 | Lazaridis et al. |
| 2010/0144269 A1* | 6/2010 | Do et al. .................. 455/41.1 |
| 2010/0264746 A1 | 10/2010 | Kazama et al. |
| 2011/0059694 A1 | 3/2011 | Audic |
| 2011/0070826 A1 | 3/2011 | Griffin et al. |
| 2011/0070828 A1 | 3/2011 | Griffin et al. |
| 2012/0169327 A1* | 7/2012 | Parco et al. .................. 324/244 |

FOREIGN PATENT DOCUMENTS

| | | |
|---|---|---|
| EP | 1973055 | 9/2008 |
| GB | 2443234 | 4/2008 |
| WO | 2006054070 | 5/2006 |
| WO | 2006109032 | 10/2006 |
| WO | 2007112787 | 10/2007 |

OTHER PUBLICATIONS

U.S. Appl. No. 13/017,473, Moosavi et al, not yet published.

* cited by examiner

MOBILE COMMUNICATIONS DEVICE PROVIDING NEAR FIELD COMMUNICATION (NFC) LOW POWER OPERATING FEATURES AND RELATED METHODS

TECHNICAL FIELD

This application relates to the field of communications, and more particularly, to electronic devices and related methods that use near field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

DETAILED DESCRIPTION

Figure 1:
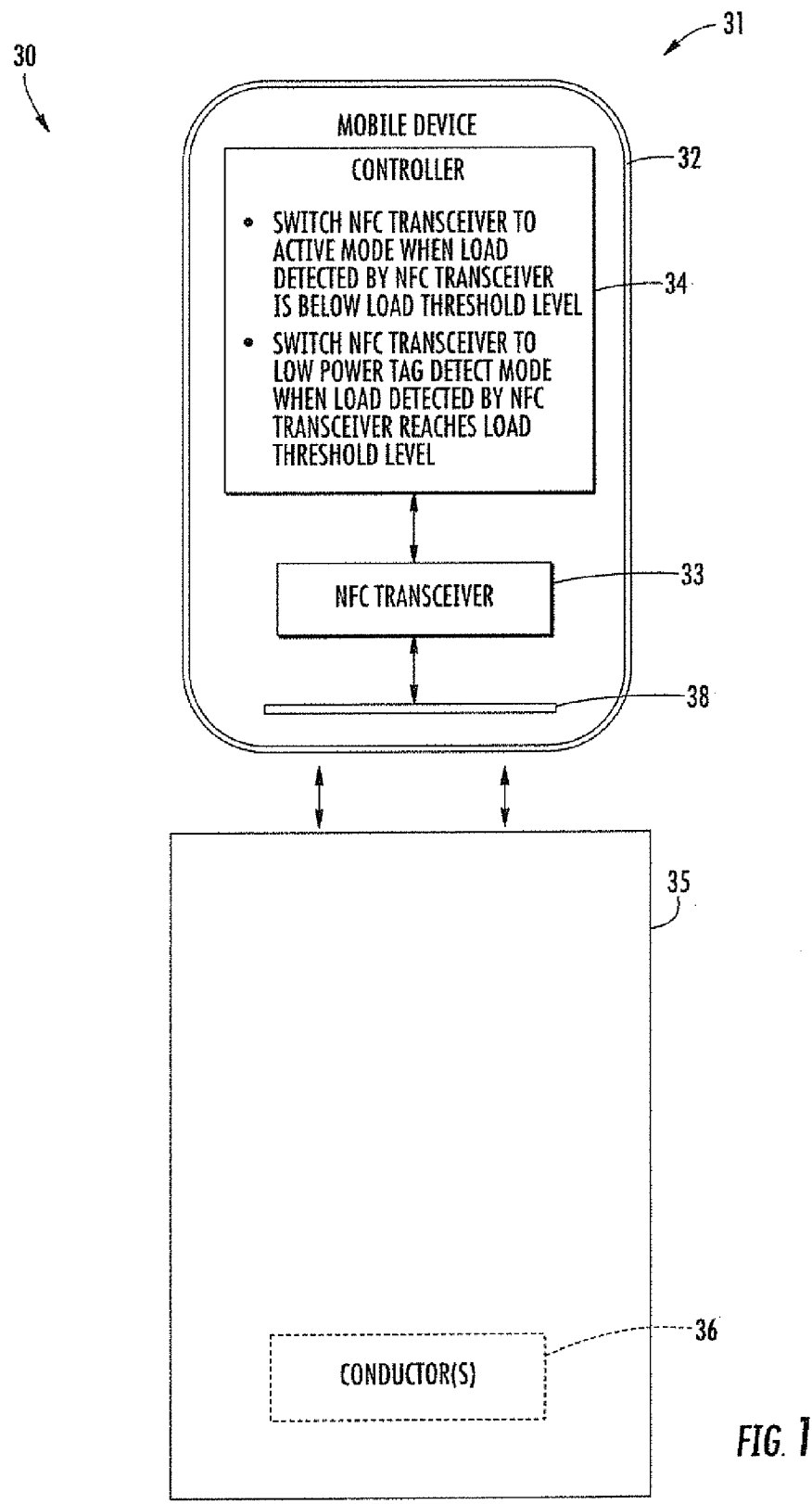
FIG. 1 is a schematic block diagram of a mobile communications device and associated mobile device accessory in accordance with one example aspect.

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in different embodiments.

Generally speaking, a system is provided herein which may include a mobile communications device including a near field communication (NFC) transceiver capable of operating in a first mode and a second mode, where the NFC transceiver may have a load threshold level associated therewith. The system may further include a controller coupled with the NFC transceiver. The controller may be capable of switching the NFC transceiver to the first mode when a load detected by the NFC transceiver is below the load threshold level, and switching the NFC transceiver to the second mode when the load detected by the NFC transceiver reaches the load threshold level. The system may also include a mobile device accessory. The mobile device accessory may include at least one conductor positioned to cause the load detected by the NFC transceiver to reach the load threshold level when the mobile device accessory is proximate to the mobile communications device. As such, the system advantageously provides for enhanced power savings by allowing operation in the low power tag detect mode with reduced instances of false positives that may cause switching to the active mode.

More particularly, the mobile communications device may further include a photodetector coupled with the controller. As such, the controller may be capable of switching the transceiver to the second mode when the load detected by the NFC transceiver reaches the load threshold level and when the photodetector indicates an ambient light level below a threshold light level. Similarly, the mobile communications device may further include a proximity detector coupled with the controller, and the controller may be capable of switching the transceiver to the second mode when the load detected by the NFC transceiver reaches the load threshold level and further based upon the proximity detector.

By way of example, the first mode may include an active mode, a peer-to-peer (P2P) mode, a read/write (R/W) mode, etc. Also by way of example, the second mode may include a low power tag detect mode. Additionally, the mobile device accessory may include a mobile device holster. In another example, the mobile device accessory may include a mobile device cradle.

A related mobile wireless communications device, and a related method for a mobile communications device, such as the one described briefly above, are also provided. The method may include switching the NFC transceiver to the first mode when a load detected by the NFC transceiver is below the load threshold level, and switching the NFC transceiver to the second mode when the load detected by the NFC transceiver reaches the load threshold level.

A related non-transitory computer-readable medium for a mobile communications device, such as the one described briefly above, is also provided. The computer-readable medium may have computer-executable instructions for causing the mobile communications device to performs steps including switching the NFC transceiver to the first mode when a load detected by the NFC transceiver is below the load threshold level, and switching the NFC transceiver to the second mode when the load detected by the NFC transceiver reaches the load threshold level.

Referring initially to FIG. 1, a communications system 30 illustratively includes a mobile communications device 31 (also referred to as a "mobile device" herein) which includes a housing 32, a near field communication (NFC) transceiver 33 and associated NFC antenna 38, and a NFC controller 34 coupled with the NFC transceiver 33. By way of example, the NFC transceiver 33, the controller 34, and the antenna 38 may be implemented as part of an NFC chipset further including an embedded memory, which may be configured as a secure element, along with associated computer-executable instructions. The controller 34 may be implemented using a combination of hardware (e.g., microprocessor, etc.) and a non-transitory computer-readable medium having computer-executable instructions for performing the various operations noted herein. Example mobile devices 31 may include portable or personal media players (e.g., music or MP3 players, video players, electronic book readers, etc.), portable gaming devices, portable or mobile telephones, smartphones, portable computers such as tablet computers and laptop computers, digital cameras, etc.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

Moreover, the NFC transceiver 33 may be operable in an active mode, such as a peer-to-peer (P2P) mode or a read/write (R/W) mode, for example. In these active modes, the NFC transceiver 33 may generate electromagnetic carrier field pulses for detecting and communicating with other types of NFC devices. However, when operating in such active modes, the NFC transceiver 33 may consume a significant amount of power (e.g., approximately several milliamps per second), which may lead to reduced battery life for the mobile device 31. As such, while this power consumption might be acceptable for short durations when the NFC transceiver 33 is actively communicating, it may be desirable to switch the NFC device to a low power mode when NFC communication is not in use.

To this end, the NFC transceiver 33 may be operated in a NFC low power tag detect mode or a card emulation (CE) mode. In the CE mode, the NFC transceiver 33 operates as a passive device, meaning it does not emit electromagnetic field pulses but instead waits for a field from a reader device, thus emulating an unpowered NFC card when it is swiped with a reader. In some embodiments, the NFC transceiver 33 may cycle between R/W, P2P, and CE modes when it is awakened or activated to scan for (or be scanned by) another NFC device, such as upon being "awakened" from the low power tag detect mode.

In the low power tag detect mode, the NFC transceiver 33 may emit electromagnetic carrier field pulses, but of a relatively shorter duration (or frequency) than in the above-noted P2P or R/W modes, to detect a load change. That is, rather than attempting to engage in near field communication, which would involve longer duration active mode pulses, for example, the NFC transceiver 33 instead emits the shorter pulses for the purpose of determining relative movement with respect to objects in its vicinity. That is, metal or other materials will result in a given load measurement or reading by the NFC transceiver 33 when it enters a low power tag detect mode. Yet, when the NFC transceiver 33 and the surrounding object(s) are moved relative to one another, then the given load measurement will change. So, for example, if this measurement changes beyond a threshold level, then the NFC transceiver 33 may determine that the mobile device 31 has been moved, which may in some circumstances be indicative that NFC communication is desired, and thus the NFC transceiver 33 may be awakened to scan for other NFC device in an active mode.

In the low power tag detect mode, the NFC transceiver 33 may have a significantly lower power consumption than when operating in one of the above-noted active modes. For example, in a low power tag detect mode, the NFC transceiver 33 may have a power consumption (e.g., current draw) in the micro amp range (e.g., approximately 15-150 µA).

As noted above, when in a low power tag detect mode, NFC transceivers are typically configured to automatically switch to an active mode (e.g., P2P or R/W) as soon as soon as a load change is detected. However, a problem associated with such configurations is that a low power tag detect mode may result in numerous false positives. For example, if the mobile device 31 were resting on a countertop with car keys close by, when the car keys are picked up, the NFC transceiver 33 would detect or determine that the load had changed. Yet, since the mobile device 31 had not moved, there would likely be no reason to initiate NFC communication, and therefore no reason to switch the NFC transceiver 33 from the low power tag detect mode to an active mode.

Figure 4:
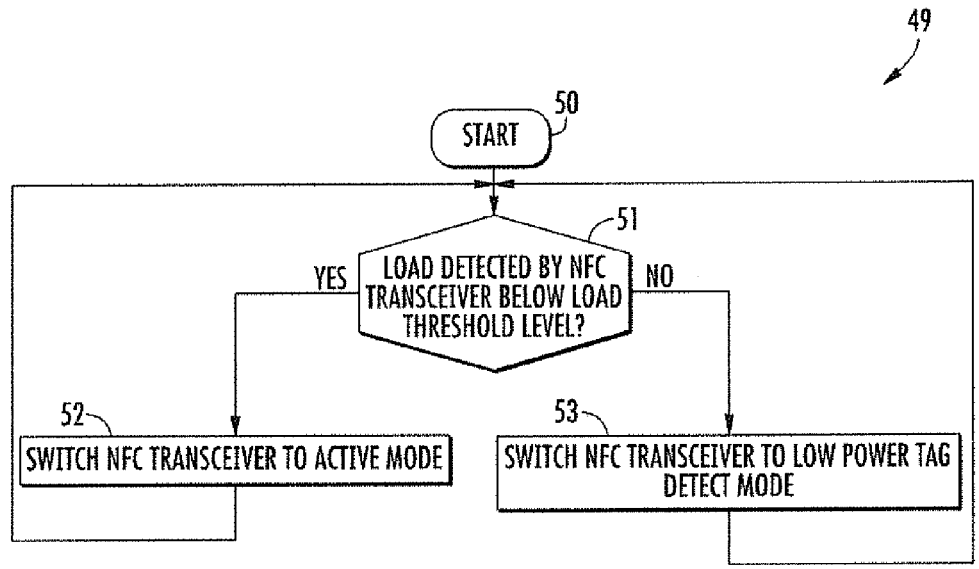
FIGS. 4 and 5 are flow diagrams illustrating example method aspects in accordance with example embodiments.

Referring additionally to the flow diagram 49 of FIG. 4, the mobile device 31 may be capable of taking advantage of low power tag detect mode power savings, while reducing incidences of false positives that would cause the NFC transceiver 33 to undesirably switch to an active mode. In particular, beginning at Block 50, the controller 34 may be capable of or configured to switch the NFC transceiver 33 to an active mode (e.g., P2P or R/W) when a load detected by the NFC transceiver 33 is below a load threshold level, at Blocks 51-52, and to switch the NFC transceiver 33 to the low power tag detect mode when the load detected by the NFC transceiver 33 reaches the load threshold level, at Block 53. This is, the NFC transceiver 33 remains in the low power tag detect mode as long as the NFC transceiver 33 is at the load threshold level.

More specifically, a receiver or indicator is said to be "saturated" when the maximum load threshold limit of its power output has been reached. Thus, a radio signal which exceeds a certain power level fixed by the design of the receiver will cause the receiver to saturate. The maximum load or saturation of the NFC transceiver 33 may be accomplished using a mobile device accessory that is capable of or configured for attachment with the mobile device 31. In particular, one or more conductors may be positioned in or on the accessory to cause the load detected by the NFC transceiver 33 to reach the load threshold level when the mobile device accessory is attached with the mobile communications device. In some embodiments, the NFC transceiver 33 may detect the conductor(s) when the mobile communications device is proximate to the mobile device accessory, for example, when the mobile communications device is being attached to the mobile device accessory.

In the example of FIG. 1, the accessory shown is a holster 35 for the mobile device 31, which includes one or more conductors 36 (e.g., metal) carried by the holster 35 such that when the mobile device 31 is positioned in the holster 35, the conductor(s) 36 overlaps the NFC antenna 38 associated with the NFC transceiver 33. Through such positioning of the conductor 36, this may advantageously result in a maximum load from the pulses emitted by the NFC transceiver 33 when operating in the low power tag detect mode. As such, this helps ensure that there will be no false positives once the mobile device 31 is inserted or positioned in the holster 35. For example, a hand, keys, or other objects coming in close proximity to the mobile device 31 will have no effect on the load measurements by the NFC transceiver 33, as it will already be at the load threshold level.

Figure 3:
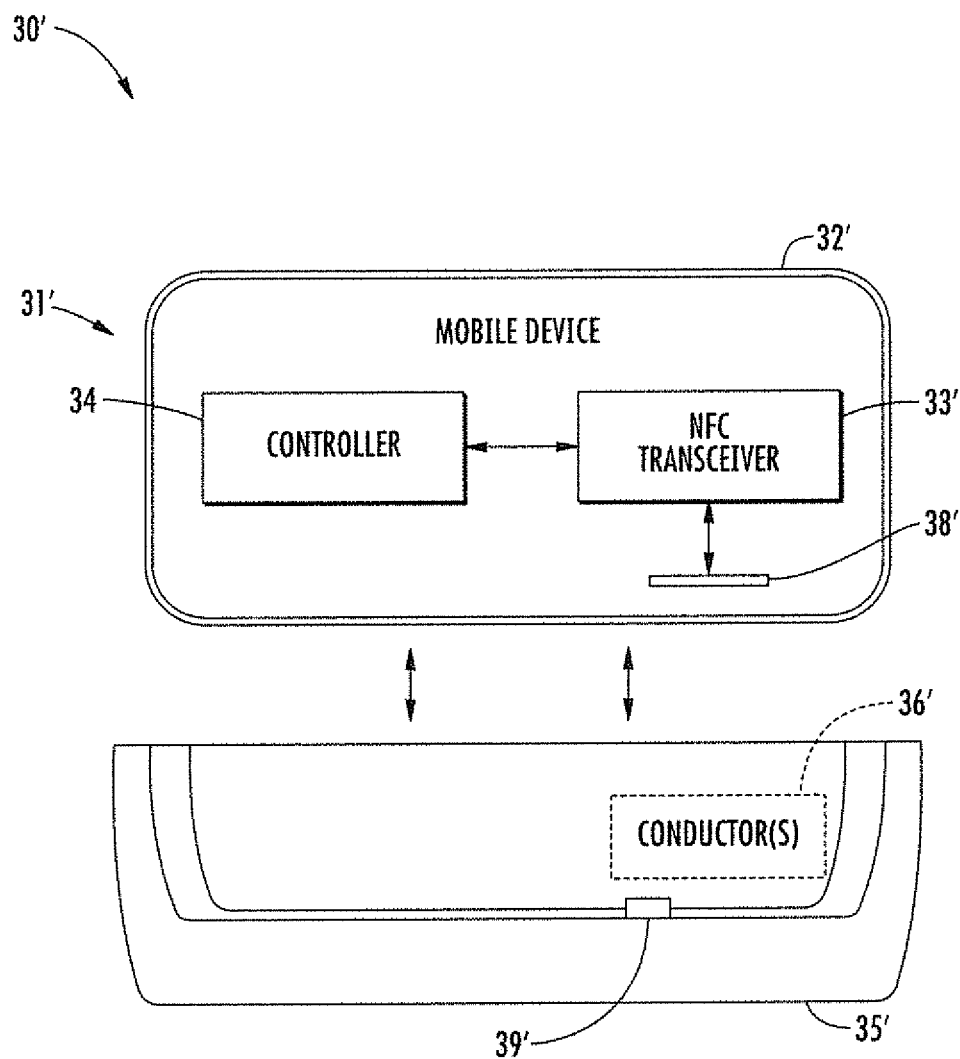
FIG. 3 is a schematic block diagram of an alternative embodiment of the mobile communications device and mobile device accessory of FIG. 1.

Another example mobile device accessory which may be used for triggering a low power tag detect mode is shown in FIG. 3. Here, the mobile device accessory includes a mobile device charger 35', in which one or more conductors 36' are similarly carried by the charger 35' so that their position corresponds with or overlaps the NFC antenna 38' of the mobile device 32' when the mobile device 32' is positioned in the charger 35'. In the illustrated example, a connection point 39' (e.g., USB, micro-USE, etc.), such as a plug or contact(s), is used to plug into the mobile device 31' to provide power for charging a battery of the mobile device 31' (not shown), and in some embodiments for providing signal connection between the controller 34' and a computer or other device for file synchronization, etc. Example chargers 35' may include cradles, pods, docks, docking stations, charging pads, etc. Other examples of mobile device accessories that may be used in different embodiments include screen covers (such as for tablet computers), device skins, moisture covers, etc.

Figure 2:
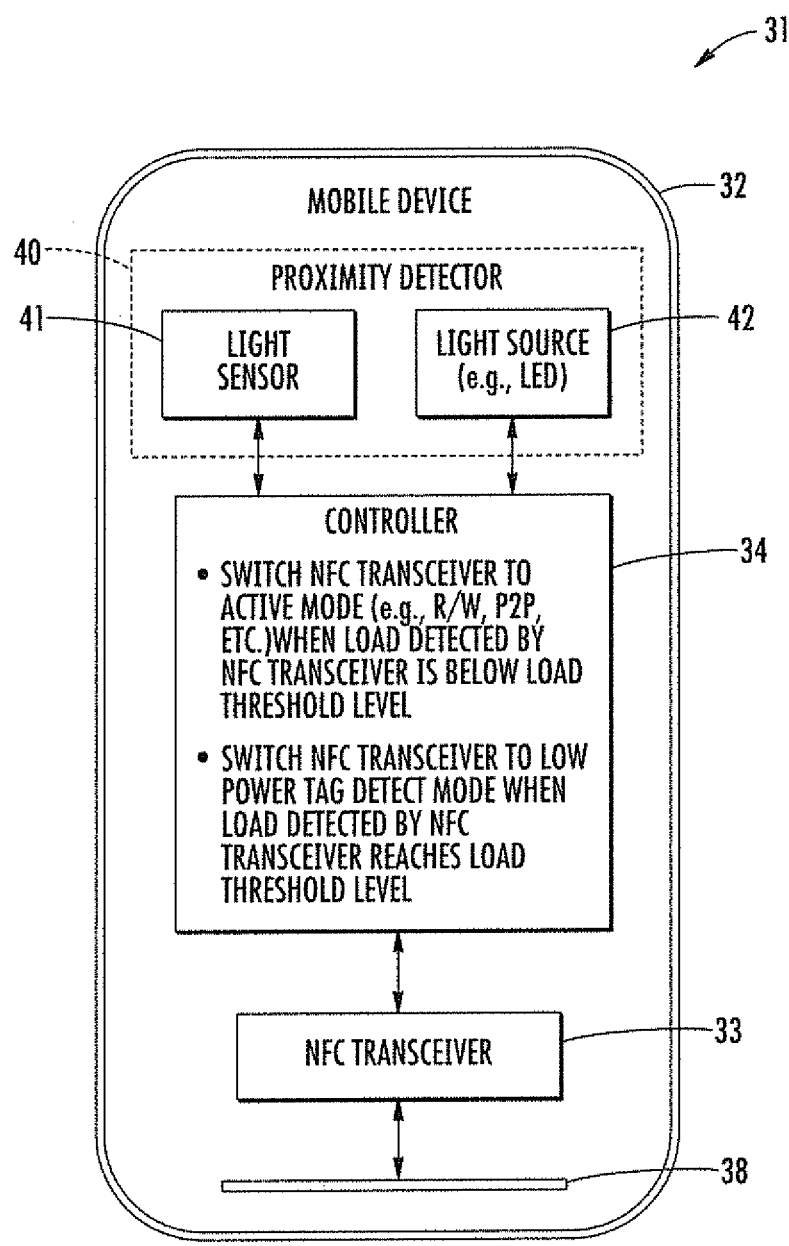
FIG. 2 is a schematic block diagram of the mobile communications device of FIG. 1 in accordance with another example aspect.
Figure 5:
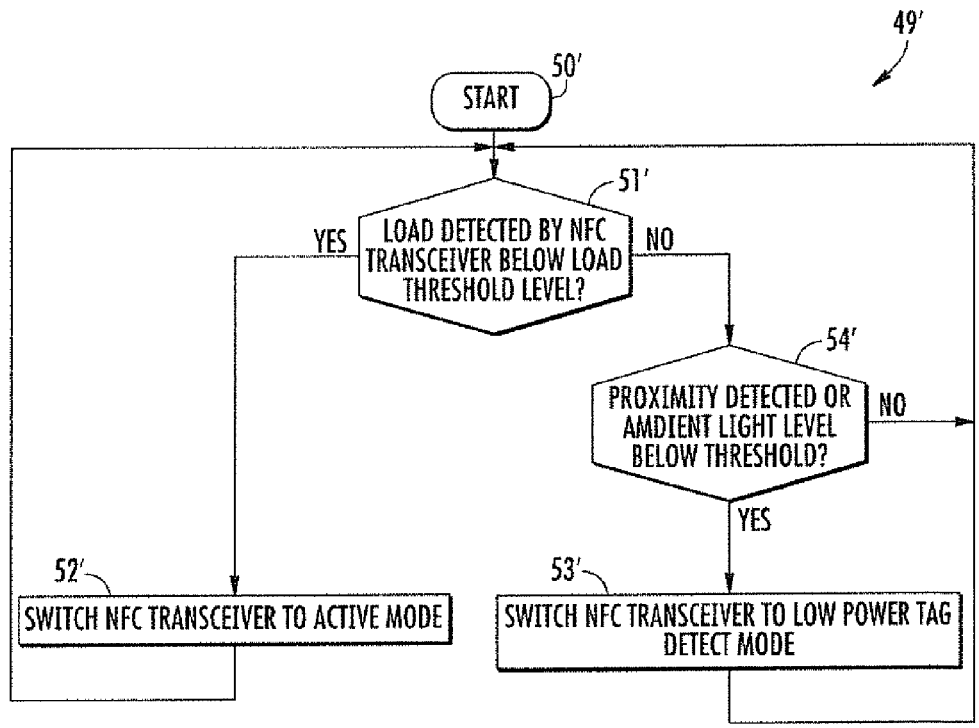

Referring additionally to FIGS. 2 and 5, the mobile device 31 may further include a proximity detector 40 coupled with the controller 34 (e.g., the controller 34 and proximity detector 40 may both communicate with a baseband processor). In the illustrated example, the proximity detector 40 includes a photodetector 41 and an associated light source 42, such as a light emitting diode (LED). In accordance with one example embodiment, the proximity detector 40 may be triggered when the photodetector 41 detects light being emitted from the light source 42, meaning that the light source 42 is covered by the mobile device accessory and reflecting light back to the light source 42.

As such, the controller 34 may be capable of switching the NFC transceiver 33 to the low power tag detect mode when the load detected by the NFC transceiver 33 reaches the load threshold level and when the proximity detector 40 indicates proximity to an object (i.e., the mobile device accessory), at Blocks 53'-54'. That is, the decision to switch to the low power tag detect mode may be based not only on the detection by the NFC transceiver 33 of the load reaching the load threshold level, but also based upon proximity of the mobile device accessory. Accordingly, this may help ensure that a brief exposure of the mobile device 31 to a metal object, for example, does not inadvertently cause the NFC transceiver to be switched to the low power tag detect mode.

In accordance with another similar aspect, the decision to switch to the low power tag detect mode may also be based upon an ambient light level detected by the light sensor 41. More particularly, if the load detected by the NFC transceiver 33 reaches the load threshold level and the ambient light detected is below a threshold light level, then the NFC transceiver 33 may be switched to the low power tag detect mode. More particularly, when coupled or attached with a mobile device accessory such as the holder 35, or placed in a pocket or pocketbook with a conductor, the photodetector 40 may be completely or partially covered, which would decrease the ambient light measured by the photodetector 41 below the threshold light level. As such, as with the proximity sensor 40, the photodetector 41 may advantageously provide another level of verification that the mobile device accessory is attached or coupled with the mobile device 31 before entering the low power tag detect mode. The steps illustrated at the remaining Blocks 50'-52' of the flow diagram 49' are similar to those described above.

In another embodiment, the mobile communications device includes a movement detecting device and the controller is capable of switching to the low power tag detect mode when the load detected by the NFC transceiver reaches the load threshold level and the movement detecting device indicates that the mobile communications device is being moved. The movement detecting device may include an accelerometer, a gyroscope, a magnetometer, a combination thereof, or the like.

In a further embodiment, the proximity detector 40 may including a sensor, such as for sensing skin, for example. Thus, similar to the photodetector 41 which may be used to help confirm positioning in a holster based upon the amount of light detected, as discussed above, a skin sensor may be used to help rule out that the mobile device 31 is in the hand of a user, for example. Accordingly, if it is determined that there is no skin in contact with the sensor, then the mobile device 31 may be considered as being in a holster, for example.

Example components of a mobile wireless communications device 1000 that may be used in accordance with the above-described embodiments are further described below with reference to FIG. 6. The device 1000 illustratively includes a housing 1200, an optional keyboard or keypad 1400 and an output device 1600. The output device shown is a display 1600, which may include a full graphic LCD. In some embodiments, the display 1600 may have an array of touch sensors associated therewith to define a touch screen that may be used an input device. Various types of display technologies may be used, including three-dimensional (3D) displays, in some embodiments. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
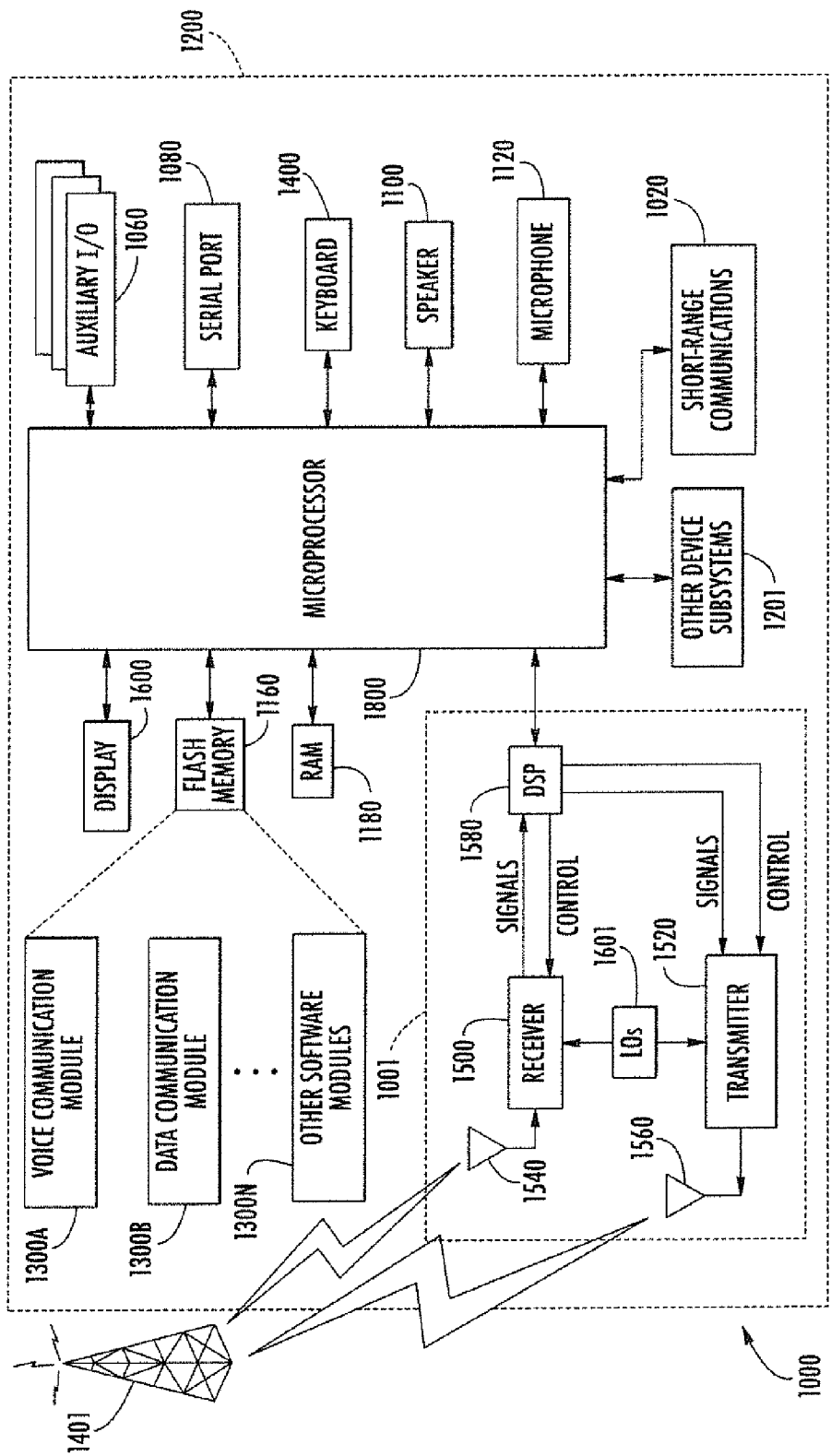
FIG. 6 is a schematic diagram illustrating example components that may be used with the mobile communications devices of FIG. 1 or 2.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may include a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, wireless local area network (WLAN) or WiFi, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device.

The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) communications module for communicating with a NFC device or NFC tag via NFC communications. Other short-range modules may includes a radio frequency identification (RFID) module, a TransferJet module, etc. Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile communications device including:
   a near field communication (NFC) transceiver capable of operating in a first mode and a second mode, the NFC transceiver being configured to consume less power in the second mode than in the first mode, the NFC transceiver having a load threshold level associated therewith; and
   a controller coupled with the NFC transceiver, the controller being capable of
      switching the NFC transceiver to the first mode when a load detected by the NFC transceiver is below the load threshold level, and
      switching the NFC transceiver to the second mode when the load detected by the NFC transceiver reaches the load threshold level.

2. The mobile communications device of claim 1 wherein the mobile communications device further includes a photodetector coupled with the controller; and wherein the controller is capable of switching the transceiver to the second mode when the load detected by the NFC transceiver reaches the load threshold level and when the photodetector indicates an ambient light level below a threshold light level.

3. The mobile communications device of claim 1 wherein the mobile communications device further includes a proximity detector coupled with the controller; and wherein the controller is capable of switching the transceiver to the second mode when the load detected by the NFC transceiver reaches the load threshold level and further based upon the proximity detector.

4. The mobile communications device of claim 1, wherein the first mode includes an active mode.

5. The mobile communications device of claim 1, wherein the second mode includes a low power tag detect mode.

6. The mobile communications device of claim 1 wherein the first mode includes a peer-to-peer (P2P) mode.

7. The mobile communications device of claim 1 wherein the first mode includes a read/write (R/W) mode.

8. A system including:
a mobile communications device including
a near field communication (NFC) transceiver capable of operating in a first mode and a second mode, the NFC transceiver having a load threshold level associated therewith, and
a controller coupled with the NFC transceiver, the controller being capable of
switching the NFC transceiver to the first mode when a load detected by the NFC transceiver is below the load threshold level, and
switching the NFC transceiver to the second mode when the load detected by the NFC transceiver reaches the load threshold level; and
a mobile device accessory including at least one conductor positioned to cause the load detected by the NFC transceiver to reach the load threshold level when the mobile device accessory is proximate to the mobile communications device.

9. The system of claim 8 wherein the mobile communications device further includes a photodetector coupled with the controller; and wherein the controller is capable of switching the transceiver to the second mode when the load detected by the NFC transceiver reaches the load threshold level and when the photodetector indicates an ambient light level below a threshold light level.

10. The system of claim 8 wherein the mobile communications device further includes a proximity detector coupled with the controller; and wherein the controller is capable of switching the transceiver to the second mode when the load detected by the NFC transceiver reaches the load threshold level and further based upon the proximity detector.

11. The system of claim 8 wherein the first mode includes a peer-to-peer (P2P) mode.

12. The system of claim 8 wherein the first mode includes a read/write (R/W) mode.

13. The system of claim 8 wherein the mobile device accessory includes a mobile device holster.

14. The system of claim 8 wherein the mobile device accessory includes a mobile device cradle.

15. A method for a mobile communications device including a near field communication (NFC) transceiver capable of operating in a first mode and a second mode, the NFC transceiver having a load threshold level associated therewith, the method including:
switching the NFC transceiver to the first mode when a load detected by the NFC transceiver is below the load threshold level; and
switching the NFC transceiver to the second mode when the load detected by the NFC transceiver reaches the load threshold level.

16. The method of claim 15 wherein the mobile communications device further includes a photodetector; and wherein switching the transceiver to the second mode further includes switching the transceiver to the second mode when the load detected by the NFC transceiver reaches the load threshold level and when the photodetector indicates an ambient light level below a threshold light level.

17. The method of claim 15 wherein the mobile communications device further includes a proximity detector; and wherein switching the transceiver to the second mode further includes switching the transceiver to the second mode when the load detected by the NFC transceiver reaches the load threshold level and further based upon the proximity detector.

18. The method of claim 15 wherein the first mode includes a peer-to-peer (P2P) mode.

19. The method of claim 15 wherein the first mode includes a read/write (R/W) mode.

20. A non-transitory computer-readable medium for a mobile communications device including a near field communication (NFC) transceiver capable of operating in an active mode and a low power tag detect mode, the NFC transceiver having a load threshold level associated therewith, the non-transitory computer-readable medium having computer-executable instructions for causing the mobile communications device to performs steps including:
switching the NFC transceiver to the active mode when a load detected by the NFC transceiver is below the load threshold level; and
switching the NFC transceiver to the low power tag detect mode when the load detected by the NFC transceiver reaches the load threshold level.

21. The non-transitory computer-readable medium of claim 20 wherein the mobile communications device further includes a light sensor; and wherein switching the transceiver to the low power tag detect mode further includes switching the transceiver to the low power tag detect mode when the load detected by the NFC transceiver reaches the load threshold level and when the light sensor indicates an ambient light level below a threshold light level.

22. The non-transitory computer-readable medium of claim 20 wherein the mobile communications device further includes a proximity detector; and wherein switching the transceiver to the low power tag detect mode further includes switching the transceiver to the low power tag detect mode when the load detected by the NFC transceiver reaches the load threshold level and further based upon the proximity detector.

23. The non-transitory computer-readable medium of claim 20 wherein the active mode includes a peer-to-peer (P2P) mode.

24. The non-transitory computer-readable medium of claim 20 wherein the active mode includes a read/write (R/W) mode.

* * * * *